United States Patent [19]

Middleton et al.

[11] 3,936,656
[45] Feb. 3, 1976

[54] METHOD OF AFFIXING AN ABRADABLE METALLIC FIBER MATERIAL TO A METAL SUBSTRATE

[75] Inventors: Robert Middleton, Palm Beach Gardens; William E. Smith, Lake Park, both of Fla.

[73] Assignee: United Technologies Corporation, Hartford, Conn.

[22] Filed: Dec. 16, 1974

[21] Appl. No.: 533,410

[52] U.S. Cl. ................ 219/76; 219/91; 219/117 R; 219/118; 219/149
[51] Int. Cl.² ...................... B23K 9/04; B21J 1/06
[58] Field of Search ............. 219/76, 77, 91, 117 R, 219/118, 149, 152

[56] References Cited
UNITED STATES PATENTS

| | | | |
|---|---|---|---|
| 1,293,867 | 2/1919 | Murray | 219/91 X |
| 1,762,694 | 6/1930 | Long et al. | 219/91 X |
| 1,947,894 | 2/1934 | Whitworth | 219/117 R X |
| 2,866,886 | 12/1958 | Koehring | 219/149 X |
| 3,242,562 | 3/1966 | Kraft | 219/117 R X |
| 3,778,586 | 12/1973 | Breton et al. | 219/76 |
| 3,889,093 | 6/1975 | Fawcett et al. | 219/77 |

Primary Examiner—J. V. Truhe
Assistant Examiner—Nathan D. Herkamp
Attorney, Agent, or Firm—Jack N. McCarthy

[57] ABSTRACT

A method for fixing an abradable material of random interlocked metallic fibers sintered and pressed to a specified thickness and density in place on a substrate is set forth where the abradable material bonded to a metal backing plate is placed with the metal backing plate engaging a substrate. The abradable material is compressed without heat to substantially a solid mass at spaced spots; the compressed spots are heated by electrical resistance to a sintering temperature and pressed to form a solid mass. The solid mass of each spot of abradable material is heated to an increased temperature by electrical resistance, welding the solid mass of abradable material to the substrate by completely penetrating the backing plate and forming a weld nugget.

7 Claims, 5 Drawing Figures

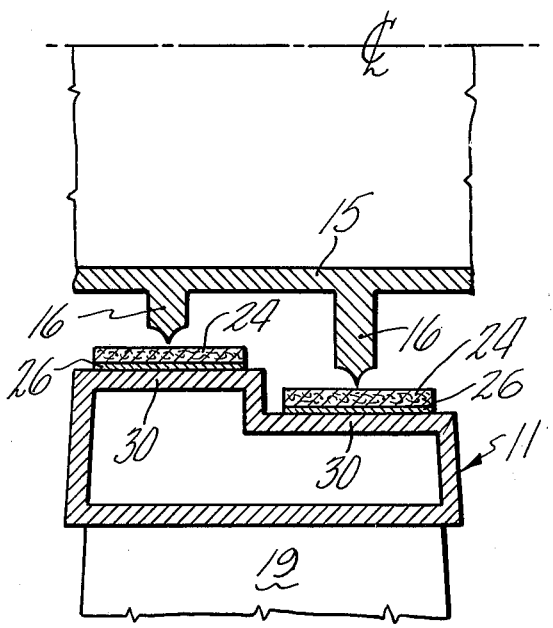
FIG._1
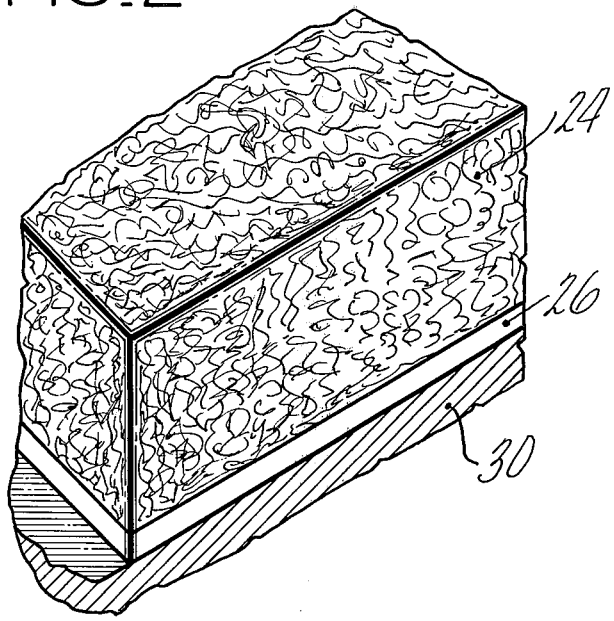
FIG._2
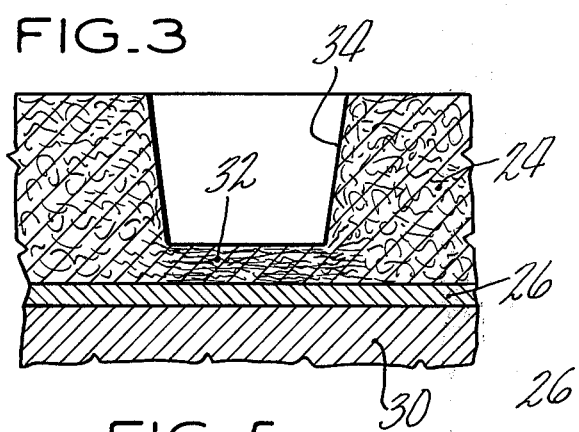
FIG._3
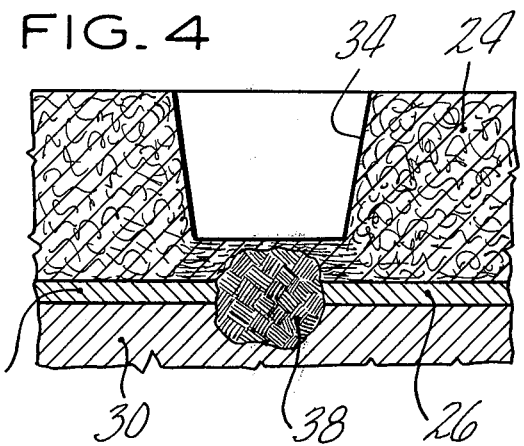
FIG._4
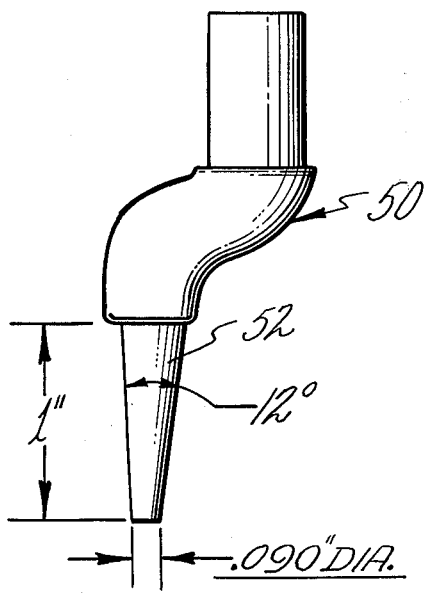
FIG._5

METHOD OF AFFIXING AN ABRADABLE METALLIC FIBER MATERIAL TO A METAL SUBSTRATE

The invention herein described was made in the course of or under a contract with the Department of the Air Force.

BACKGROUND OF THE INVENTION

This invention relates to methods for fixing abradable material to a substrate for use in providing one part of a seal which is usually positioned to cooperate with another moving part.

While abradable materials have been used before, the means for attaching the material has not been entirely satisfactory. The usual way of applying the abradable seal to the substrate was to braze the abradable material along its mating face to the substrate. Patents disclosing abradable materials connected to a substrate are set forth in the following description.

SUMMARY OF THE INVENTION

A primary object of the present invention is to provide a method for satisfactorily welding abradable metallic fibrous material to a metal substrate.

In accordance with the present invention, the abradable metallic fibrous material is compressed at locations, with each location then being heated and further compressed to place the metallic fibrous material in a solid state, using increased heating, the abradable material is then welded to the metal substrate.

In accordance with a further aspect of the invention, the abradable material is first bonded to a backing plate with the resistance welding being made at increased temperature to weld the abradable material to the substrate by completely penetrating the backing plate and forming a weld nugget.

BRIEF DESCRIPTION OF THE DRAWINGS

FIG. 1 is a view showing the location of a seal between compressor stages in a gas turbine engine.

FIG. 2 is an enlarged perspective view showing a section of abradable material bonded to a metal backing plate which is in turn welded to a substrate.

FIG. 3 is a sectional view showing the abradable material, backing plate and substrate where a spot in said abradable material has been compressed to substantially a solid mass.

FIG. 4 is a sectional view showing the abradable material backing plate substrate where the spot has been heated and pressed to form a solid mass with increased heat resistance welding the abradable material to the substrate by completely penetrating the backing plate and forming a weld nugget.

FIG. 5 is a view showing the top electrode used for pressing and heating the abradable material, backing plate and substrate.

DESCRIPTION OF THE PREFERRED EMBODIMENT

Referring to FIG. 1 a sleeve 15 is shown which is mounted for rotation between two compressor discs (not shown) with spaced projections 16 positioned thereon to provide a labyrinth seal. An annular stationary shroud 11 is positioned around the tips of the projections 16. The shroud 11 is fixed to the inner tips of compressor vanes 19. Abradable material 24 fixed to a backing plate 26 is then fixed to the inner surface of the stationary shroud 11 radially outwardly from each projection 16 to provide the cooperating seal part with labyrinth seal.

While this seal part is shown using abradable material between the rotating sleeve 14 of a compressor and the inner face of an annular shroud fixed to the inner ends of vanes 19, the abradable material can also be used on the inner surface of the compressor casing, radially outwardly from the outer tips of the blades. Both of these uses are shown in U.S. Pat. No. 3,519,282 and U.S. Pat. No. 3,537,713.

The abradable material 24 referred to is material of random interlocked metallic fibers, sintered and pressed to a specified thickness and density. Disclosure of such a material is set forth in U.S. Pat. No. 3,127,668 and U.S. Pat. No. 3,701,536. One abradable material which has been used in the present invention is sold under the trademark "Feltmetal."

To fix the abradable material 24 in place on a substrate 30 such as a stationary annular metal shroud, the following steps are taken:

1. the abradable material 24 is bonded to a metal backing plate 26;
2. the abradable material and backing plate are placed so that the backing plate will engage the inner surface of the substrate;
3. the abradable material 24 is compressed without heat to substantially a solid mass 32 at spaced spots 34;
4. the compressed spaced spots 34 of abradable material are heated by electrical resistance to a sintering temperature and pressed to form a solid mass;
5. the solid mass of the spots of abradable material is heated to an increased temperature by electrical resistance to weld the solid mass of abradable material to the substrate by completely penetrating the backing plate and forming a weld nugget.

If desired, the holes made in the abradable material 24 by using the steps of the method above can be filled in by inserting a core or plug of the abradable material in each hole and bonding it therein. The opening can also be filled by a metallic slurry which can be poured in and allowed to harden.

In one example, according to this invention, in affixing an abradable material bonded to a backing plate to a metal substrate, the abradable material used was a random interlocked structure of sintered fibers of Haynes 188 alloy with the nominal density of the material being 19 percent, the backing plate material used was Inconel 600 (AMS 5540), and the substrate material used was Inco 718 (AMS 5663). The thickness of the abradable material was approximately 0.125 inch and the thickness of the backing plate was approximately 0.008 inch. The metal substrate was a fixed annular shroud in an engine.

The welding in the example above was made on conventional electrical resistance welding equipment having a top electrode 50 such as shown in FIG. 5 and a regular lower electrode. The lower electrode was a Class 3 and had a 0.250 inch diameter flat face. The top electrode had a welding tip 52 one inch in length with a tapered surface forming a 12° angle with a flat face having a 0.090 inch diameter.

Other heat and corrosion resistance steels or alloys used as backing plate material have been the following:

HASTALLOY X (AMS 5536), L-605 (AMS 5537) and 430 Stainless Steel (AMS 5503). Another material which has been used for the metal substrate has been WASPALOY (AMS 5707).

In fixing a strip of abradable material and backing plate approximately a half inch wide to a substrate, a spacing of spots a half inch apart was used down the centerline of the combined abradable material and metal backing plate. In fixing a strip of the same combined abradable material and metal backing plate of approximately an inch and a quarter wide, three rows of spots were used with one row on the centerline and each of the other rows being spaced an eighth of an inch from an edge. The spots in each of the three rows were spaced one inch apart, however, the spots in the two rows on the edges were longitudinally aligned at a point midway between the spots on the centerline.

While a specific abradable material is referred to, it is noted that the material may also be formed of randomly bonded metallic particles sintered to a specified thickness. One abradable material of this type which has been used is sold under the tradename "AB-1."

We claim:

1. A method for fixing an abradable material formed of metallic particles randomly affixed to each other and sintered to a specified thickness and density to a metal substrate comprising the steps of:
   1. fixing the abradable material to a metal backing plate;
   2. placing the abradable material and backing plate so that the backing plate will engage a surface of a metal substrate;
   3. compressing the abradable material to substantially a solid mass at spaced locations;
   4. heating the compressed spaced locations of abradable material by electrical resistance to a sintering temperature and pressing the spots to form a solid mass;
   5. heating the solid mass of locations of abradable material to an increased temperature by electrical resistance, welding the solid mass of abradable material to the substrate completely penetrating the backing plate.

2. A method as set forth in claim 1 wherein the particles are fibers and randomly interlocked and wherein step (1) the abradable material is bonded to a metal backing plate.

3. A method as set forth in claim 1 wherein step 3 said spaced locations are formed as spots.

4. A method as set forth in claim 1 wherein the metallic fibers of the abradable material are formed of Haynes 188 alloy.

5. A method as set forth in claim 1 wherein said metal backing plate is formed of Inconel 600.

6. A method as set forth in claim 1 wherein the substrate is formed of Inco 718.

7. A method for fixing an abradable material formed of random interlocked metallic fibers, sintered and pressed to a specified thickness and density to a metal substrate comprising the steps of:
   1. placing the abradable material in position on the substrate;
   2. compressing the abradable material to substantially a solid mass at spaced locations;
   3. heating the compressed spaced locations of abradable material by electrical resistance to a sintering temperature and pressing the spots to form a solid mass;
   4. heating the solid mass of locations of abradable material to an increased temperature by electrical resistance, welding the solid mass of abradable material to the substrate.

* * * * *